May 21, 1963 J. W. CRANE ET AL 3,090,295
HARVESTER
Filed Aug. 2, 1960 7 Sheets-Sheet 1

Fig. 1.

INVENTORS
JACK W. CRANE
ALBERT M. BEST
WILLIAM J. DWYER &
WILLIAM G. SEARLES
By Joseph Allen Brown
ATTORNEY

INVENTORS
JACK W. CRANE, ALBERT M. BEST,
WILLIAM J. DWYER & WILLIAM G. SEARLES

By Joseph Allen Brown
ATTORNEY

United States Patent Office 3,090,295
Patented May 21, 1963

3,090,295
HARVESTER
Jack W. Crane and Albert M. Best, New Holland, Pa., and William J. Dwyer, Springfield, Ill., and William G. Searles, Indianapolis, Ind., assignors to Sperry Rand Corporation, New Holland, Pa., a corporation of Delaware
Filed Aug. 2, 1960, Ser. No. 47,049
16 Claims. (Cl. 100—97)

This invention relates generally to compressing apparatus and more particularly to a harvesting machine adapted to pick up previously cut crop material in a field, convey it to compressing means and there form the material into pellets which are then deposited in a suitable receptacle such as a trailing vehicle.

One object of this invention is to provide a hay pelleting machine having dual reciprocable pellet forming means operable out of phase with each other to thereby provide a counterbalanced action to minimize vibrations of the machine.

Another object of this invention is to provide a hay pelleter of the character described which has a high output capacity.

Another object of this invention is to provide, in a hay pelleter of the character described, efficient feed means adapted to divide an incoming stream of material into two sections, one for each member of a pair of compression chambers.

Another object of this invention is to provide a hay pelleter of the character described having feeding means which delivers crop material to a pair of pellet compression chambers in continuous streams and in timed relation with pellet forming means operable therein.

A further object of this invention is to provide a hay pelleter having feeding means which is so designed that once crop material has been delivered to a given compression chamber, it is prevented from escaping therefrom before it can be engaged by the pellet forming means.

A still further object of this invention is to provide a hay pelleter of the character described having an infeed mechanism which provides continuous and positive control of the infeed of hay into the machine.

Other objects of this invention will be apparent hereinafter from the specification and from the recital in the appended claims.

Figure 1:
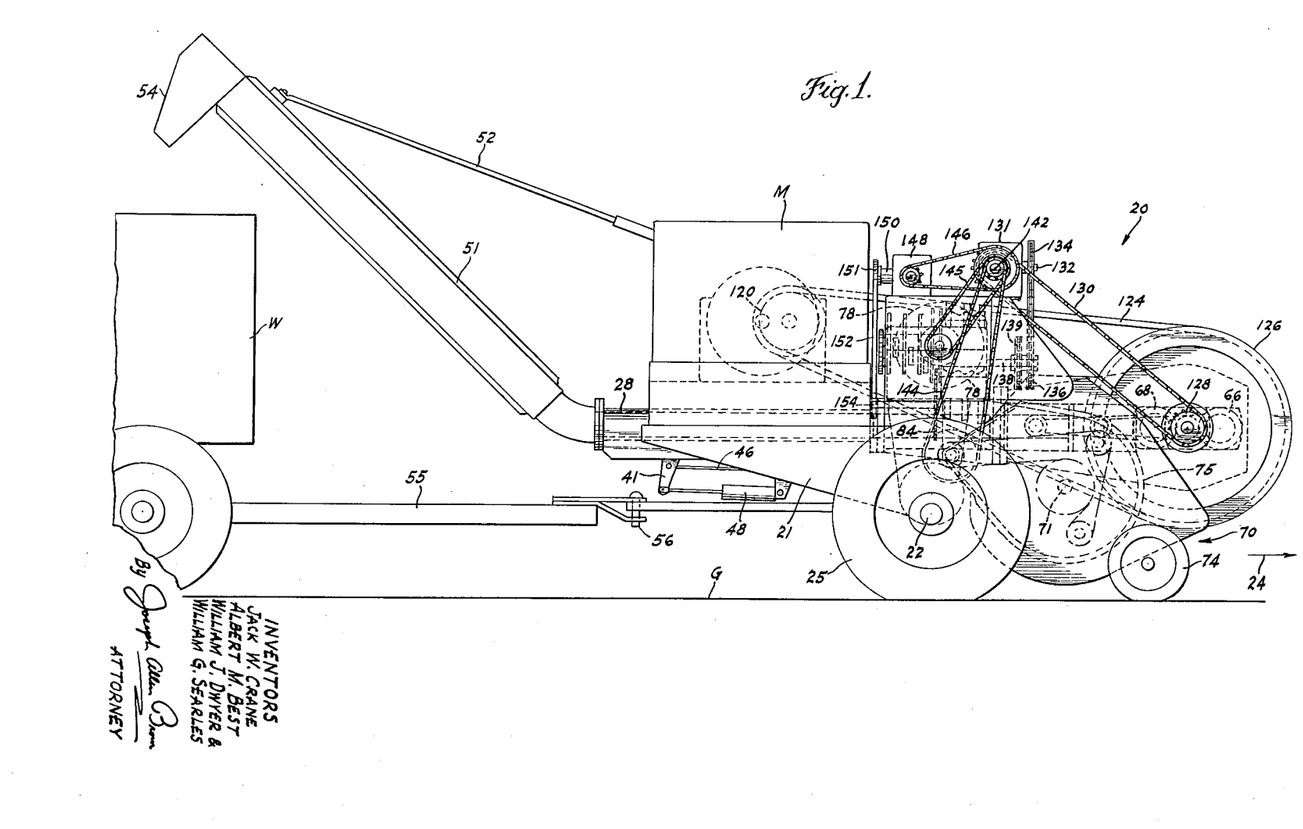
FIG. 1 is a side elevation of a mobile hay pelleter constructed according to this invention, such figure showing a vehicle trailing behind the pelleter to receive the completed pellets discharged therefrom.
Figure 2:
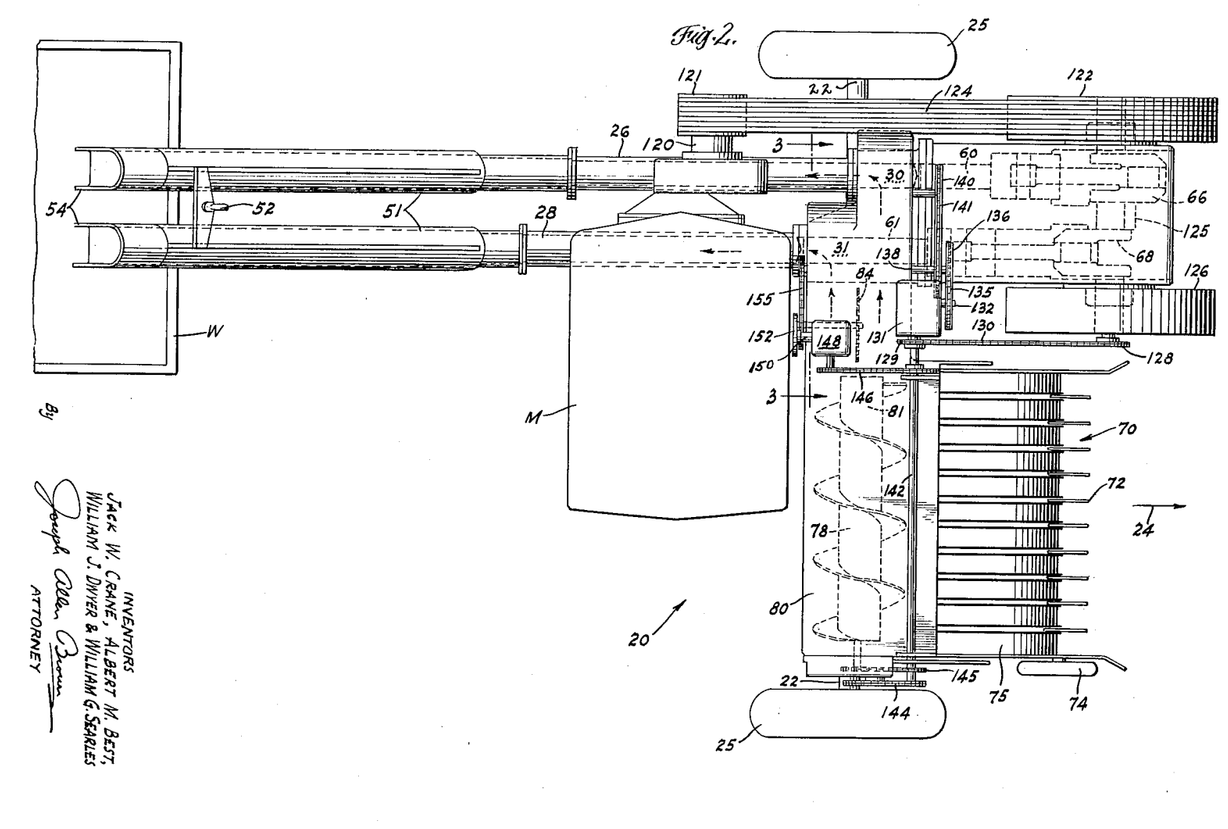
FIG. 2 is a plan view of FIG. 1.

Referring now to the drawings by numerals of reference, and particularly to FIGS. 1 and 2, 20 indicates generally a field pelleter constructed according to this invention. The pelleter comprises a frame structure 21 including a main axle 22 which extends transverse to the direction of travel of the machine, indicated by the arrow 24. Axle 22 is supported at its respective ends by ground wheels 25. Pelleter 20 is adapted to be connected by a tongue, not shown, to a tractor or other vehicle, to be towed thereby. The various components of the machine are operated by a motor M suitably mounted on frame 21 toward the rear of the machine.

The pellets of hay are formed in two fore-and-aft extending tubular compression chambers or chokes 26 and 28 which extend parallel to each other. These chambers are located in a generally common, horizontal plane. The forward ends of the chambers 26 and 28 have laterally opened inlet sections 30 and 31, respectively, section 30 being disposed forwardly of the section 31, FIGS. 2 and 5.

Figure 8:
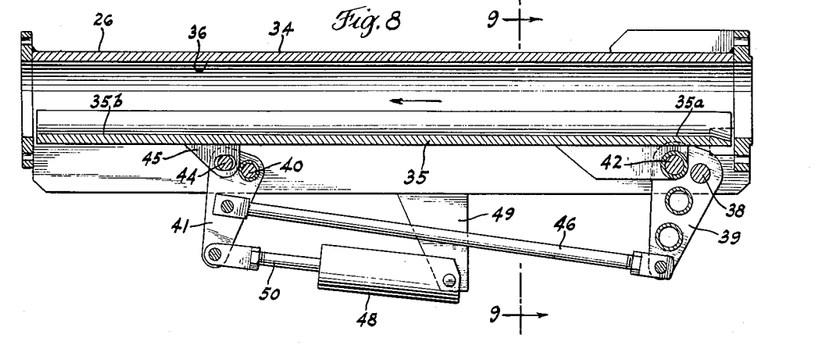
FIG. 8 is a longitudinal sectional through one of the two compression chambers of the pelleter.
Figures 9, 10:
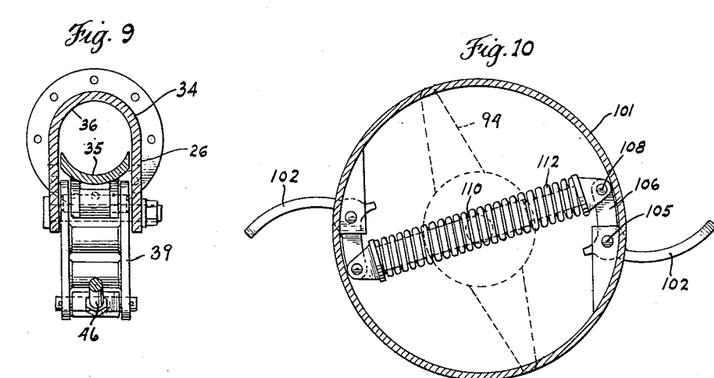
FIG. 9 is a section taken on the line 9—9 of FIG. 8 looking in the direction of the arrows.
FIG. 10 is a section through one of the feed rolls of the infeed mechanism and taken generally on the line 10—10 of FIG. 3 looking in the direction of the arrows.

Each compression chamber is constructed as best shown in FIGS. 8 and 9. It comprises a fixed inverted U-shaped member 34 and a pressure control plate 35 which, with member 34, forms a cylinder 36. Plate 35 provides density control means responsive to both longitudinal and radial pressure of the crop material forced through the compression chamber. The forward end 35a of plate 35 is pivotally supported at 38 on a bell crank 39. The rear end 35b of plate 35 is pivotally supported at 40 on a bell crank 41. The bell crank 39 is connected to the plate 35 by a pivot pin 42. The bell crank 41 is connected to the rear end of plate 35 by a pivot pin 44 which extends through slotted member 45. The lower end of bell crank 39 is connected to a medial point on the bell crank 41 by a link 46. A hydraulic cylinder mechanism 48, pivotally mounted on bracket 49, is connected by piston rod 50 to the lower end of bell crank 41. The hydraulic fluid in cylinder 49 resists shifting movement of the piston rod 50 toward the right of FIG. 8.

When the density or pressure of material moving toward the left in the compression chamber exceeds a predetermined amount, the pressure plate 35 will be shifted to the left. Responsive to such shifting, the forward bell crank 39 will pivot about pin 38 and there will be a slight downward movement of the forward end 35a of the plate 35. At the same time, bell crank 41 will pivot about pivot 40. The linkage arrangement is such that there will be a greater downward movement of the rearward end 35b of the pressure plate than there is of the forward end 35a. In this way, the excessive compression of the crop material will be relieved, allowing easier passage of material through the compression chamber. When the overload condition has passed, the hydraulic mechanism 48 will cause the pressure plate to return toward its normal, neutral position, as shown. Thus, the machine has density control means whereby variations in the quantity, moisture content and type of the crop material entering the machine can be compensated for.

The formed pellets discharged from the compression chambers 26 and 28 are deposited in upwardly and rearwardly extending conveyor tubes 51 suitably supported by a brace member 52. At their upper ends, the tubes 51 have spouts 54 which direct the pellets into a trailing wagon W connected to the pelleting machine by a drawbar 55 (FIG. 1) A simple hitch pin connection 56 is provided between the pelleter and the wagon whereby when the wagon is full it may be detached and an empty wagon hooked up to the machine.

Crop material deposited in the inlet sections 30 and 31 of the compression chambers 26 and 28 is formed into pellets by compression pistons 60 and 61 operable to force material into chambers 26 and 28, respectively. The inside diameters of the compression chambers and the diameters of the pistons 60 and 61 may be provided as desired according to the size of pellets to be formed. For example, the diameter of the pistons and cylinders might be four inches.

Figure 5:
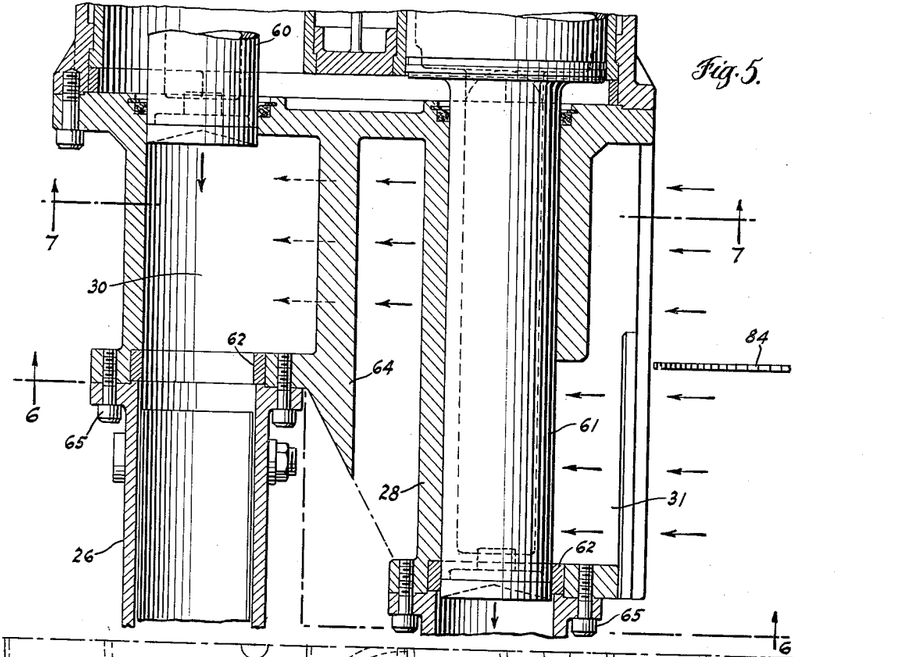
FIG. 5 is a plan section of the casting which forms the inlet portions of the compression chambers of the pelleter and showing one of the pellet forming pistons in fully retracted position and the other in its fully advanced position; the section is taken on the line 5—5 of FIG. 6 looking in the direction of the arrows.
Figure 6:
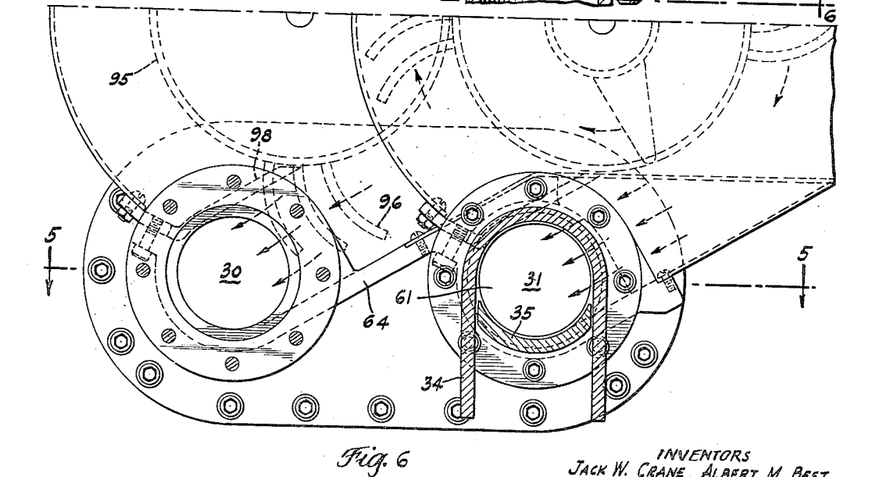
FIG. 6 is a section taken on the lines 6—6 of FIG. 5 looking in the direction of the arrows and showing in dotted lines the relation of the infeed rollers thereto.

As shown best in FIG. 5, inlet sections 30 and 31 are provided with fixed die members 62 which provide a shearing edge cooperative with the heads of the pistons for shearing the material forced into the compression chambers. The respective inlet sections are formed by a one piece casting 64 constructed as shown in FIG. 5 and to which the compression chambers 26 and 28 are connected by fastening bolts 65, with their longitudinal axes common with the axes of pistons.

Figure 11:
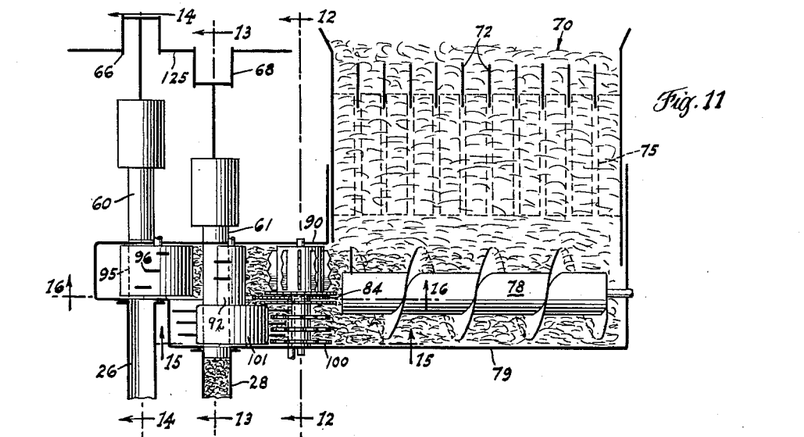
FIG. 11 is a diagrammatic plan section showing the main elements of the pelleting machine.
Figure 12:
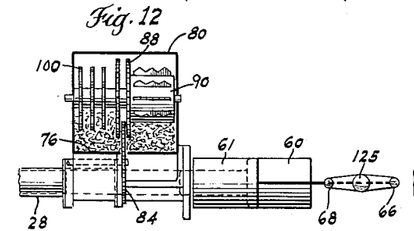
FIGS. 12–16 are diagrammatic sections taken on the respective section lines shown in FIG. 11 looking in the directions of the respective arrows.
Figure 13:
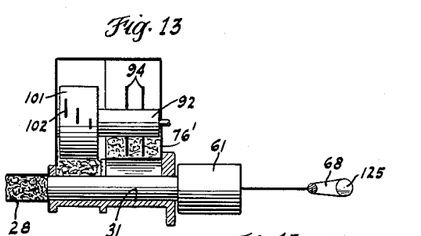
Figure 14:
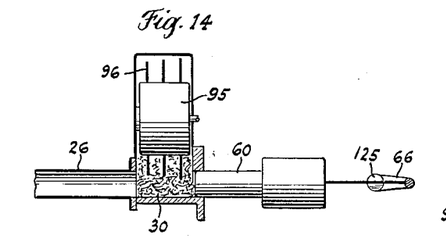

As shown best in FIGS. 2 and 11, pistons 60 and 61 are driven by crank arms 66 and 68, respectively, which operate out of phase with each other. The inertia resulting from the reciprocation of the piston 60 is counterbalanced by the opposite action of the piston 61. Thus, the pellet forming operation is continually counterbalanced to minimize vibrations during operation of the machine.

Mechanism is provided for alternately feeding material into the inlet sections 30 and 31. While the piston 61 is on a working stroke as shown in FIG. 5, the piston 60 is retracted and section 30 is opened for the reception of the material. In like respect, when the piston 60 is extended the piston 61 is retracted wherein inlet section 31 is opened and available to receive material. The infeed mechanism is designed to alternately charge the infeed sections when their respective plungers are in retracted positions. The infeed mechanism comprises a pick-up 70 which may be of conventional design having a reel 71 and pick-up fingers 72 (FIGS. 1, 2 and 11). The pick-up extends laterally of the compression chambers and is provided with a ground wheel 74 whereby the pick-up may float responsive to variations in ground conditions. When viewed as showed in FIG. 1, the pick-up rotates in a counterclockwise direction whereby crop material resting on the ground G is elevated by fingers 72 and conveyed over stripper members 75 of the pick-up to a feed platform 76. Operable above feed platform 76 is an auger conveyor 78 having a length substantially the same as the width of the pick-up. Upon viewing FIGS. 2 and 11, it will be seen that the material elevated by the pick-up and conveyed rearwardly to the auger is then conveyed laterally toward the inlet sections 30 and 31 of the compression chamber.

Material is prevented from escaping rearwardly and upwardly of the auger by a vertical wall 79 and a top wall 80 overlying the auger. Located immediately adjacent the discharge end 81 of the auger conveyor 78 is crop severing or dividing means comprising a circular saw 84, FIGS. 1–5, 11, 12, 15 and 16. The saw 84 is rotatable on an axis which is parallel to the direction of travel of the machine and parallel to the fore-and-aft extension of the compression chambers 26 and 28. It extends in a vertical plane so located that the middle of the stream of material coming from the auger conveyor 78 engages the saw. As shown in FIG. 4, the saw is disposed with its axis below the level of the feed platform 76. Its teeth 85 project toward the direction of rotation of the saw, indicated by the arrow 86. Thus, the saw teeth move up into the stream of material passing over it and in the same direction as the movement of the material. A pair of star like wheels 88, one on each side of the saw 84, are provided for pressing the material downwardly as it comes off the auger conveyor and into the saw blade whereby the material will be positively severed and divided into two completely separate sections. The star wheels 88 rotate in a direction indicated by the arrow 89 in FIG. 4.

Figure 7:
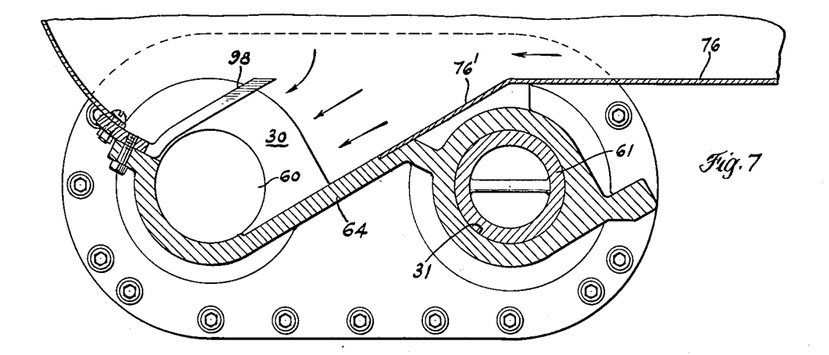
FIG. 7 is a section taken on the line 7—7 of FIG. 5 looking in the direction of the arrows.

The longitudinal center of the stream of crop material discharged from the auger passes beneath these star wheels and is severed by the action of the saw. Two separate portions of materials are thus formed, one forwardly and one rearwardly of the saw and one adapted to be delivered to inlet section 30 and the other adapted to be delivered to inlet section 31. The crop material forwardly of saw 84 is compressed and conveyed toward inlet section 31 (FIGS. 3, 11 and 16) by a presser roller 90 having peripheral fore-and-aft extending toothed slats 91. Presser roller 90 delivers the material to an intermediate feed roller 92 having radial fingers 94. These fingers convey the material to an infeed roller 95 which has a double set of three feed fingers each, which fingers are indicated at 96. Each set of fingers comprises a forward finger 96a, a middle finger 96b and a rear finger 96c as shown best in FIG. 3. It will be noted that the three fingers in each set are angularly displaced relative to each other. The fingers are so disposed that the forward finger enters inlet chamber 30 first, followed by the middle finger and then the rearward finger. In like respect, the first finger is extracted from inlet chamber 30, then the middle finger and finally the rear finger. This arrangement is provided so that there can be a close timed relationship between the fingers and piston 60. The piston 60 will move part way into inlet chamber 30 to begin to compress a charge of material delivered therein before all of the fingers have extracted. The close relationship between the piston and the infeed fingers insures that no material will escape back out of the inlet chamber before it is restrained by the plunger. At best shown in FIGS. 7 and 16, inlet chamber 30 is provided with stripper fingers 98 between which the fingers 96 pass when they deliver material. Thus, the crop material is stripped from the fingers once it is deposited in the inlet chamber. It will also be noted from FIG. 4 and other views that the fingers 96 are curved away from their direction of travel whereby when they sweep downwardly and inwardly toward inlet chamber 30 they force the material toward the bottom of the chamber.

It is thus seen that the portion of the material coming from the auger conveyor 78 located forwardly of the saw 84 is precompressed and conveyed by the presser roller 90 and then conveyed therefrom to the infeed roller 95 by the intermediate roller 94. The fingers 96 on roller 95 sweep the material into the inlet chamber 30 where it will be compressed by piston 60.

Figure 3:
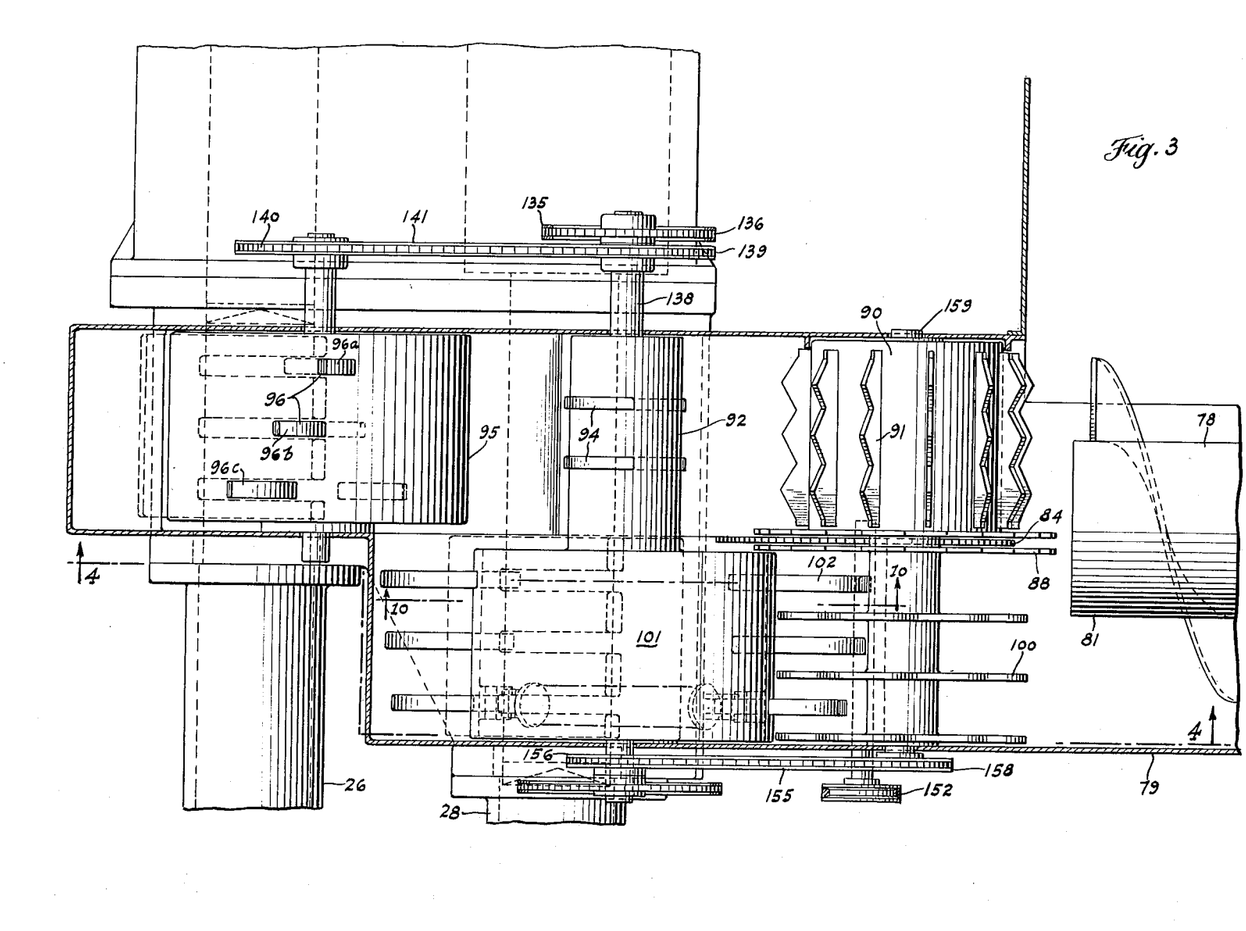
FIG. 3 is a plan view, on a substantially enlarged scale, of the infeed mechanism of the pelleter.
Figure 4:
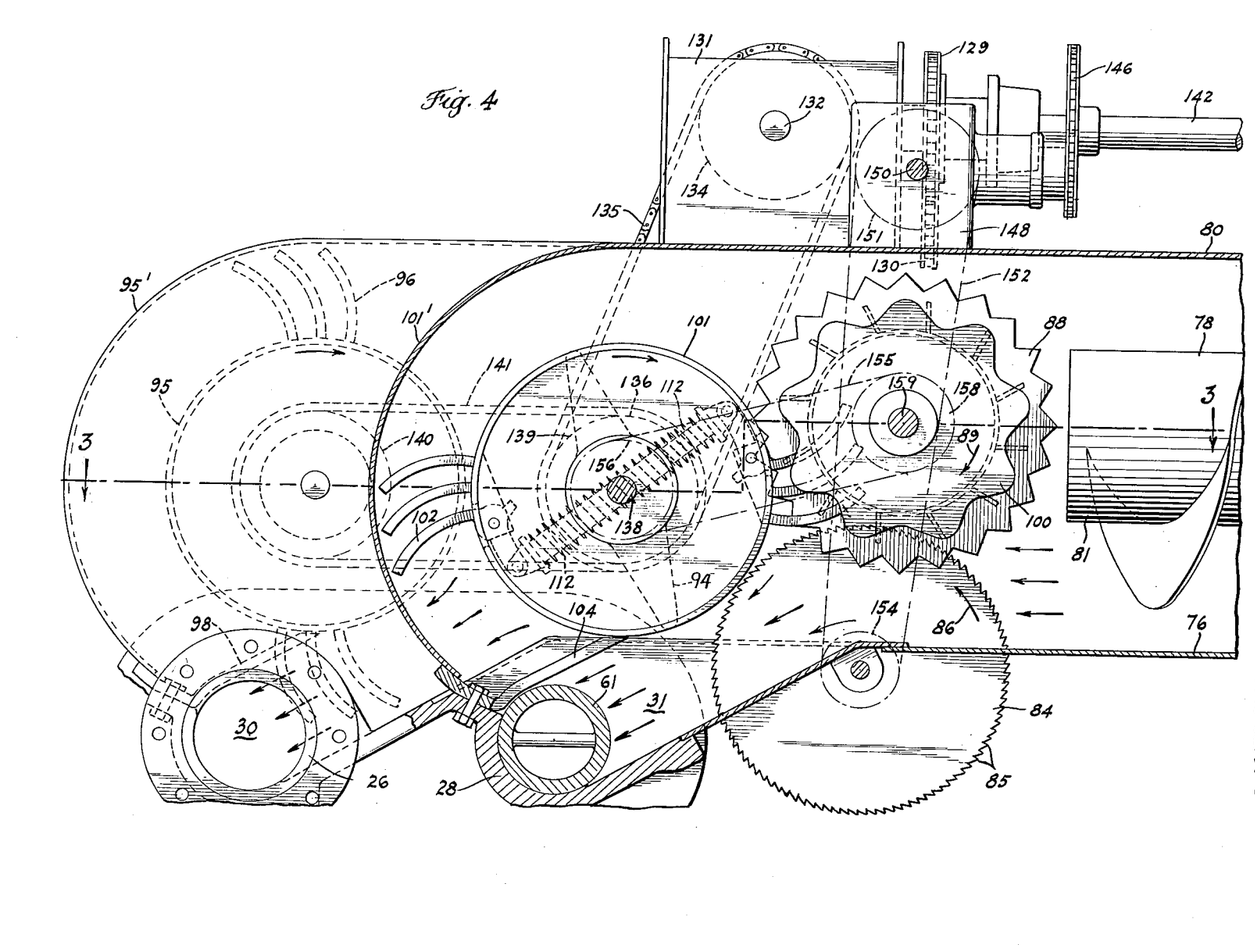
FIG. 4 is a section taken on the lines 4—4 of FIG. 3 looking in the direction of the arrows.

It will be noted from FIGS. 3 and 4 that the crop material which is fed into inlet chamber 30 passes over the path of reciprocation of the piston 61. Then it drops downwardly into chamber 30. A suitable extension 76′ (FIG. 7) is provided to support the material over piston 61.

Figure 15:
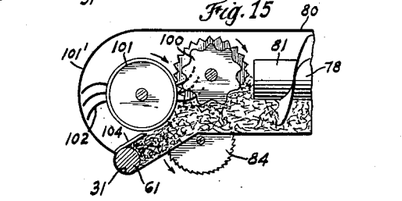
Figure 16:
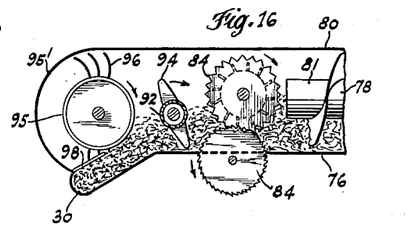

The crop material portion located rearwardly of the saw 84, as it moves toward the compression chambers, is deposited in inlet chamber 31, as best shown in FIGS. 4 and 15. A presser roll 100 compresses the crop material and delivers it to an infeed roller 101 similar to the feed roller 95. The fingers 102 on roller 101 sweep the crop material downwardly and into inlet chamber 31. Stripper fingers 104 remove the material from the fingers 102 after the material has been deposited in the chamber.

Both of the infeed rollers 95 and 101 are constructed as shown best in FIG. 10, which is a section through the infeed roller 101. The fingers 102 are pivotally mounted about fixed pivots 105. The fingers have arms 106 inside the compression roller which are pivotally connected at 108 to one end of the pair of telescopic members 110 surrounded by a compression spring 112. Fingers 102 are adapted to yield rearwardly relative to direction of travel on a feeding stroke and against the resistance of the spring 112. As shown in FIG. 10, if either set of fingers pivots in a counterclockwise direction, the associated arm 106 will swing inwardly causing the telescopic members 110 to move together and thereby compress the spring 112. Once the crop material has been stripped from the fingers by the stripper members 104, the spring 112 will return the fingers 102 to their normal positions. It will be understood that the roller 95 is constructed in the same manner as that shown for the roller 101 in FIG. 10. Also, both infeed rollers are enclosed by concentric housing sections 95' and 101', respectively.

The drive mechanism for the various components described is shown in FIGS. 1–4 and comprises an output shaft 120 from the motor M. A multiple pulley 121 is connected to such shaft and such pulley drives a large diameter flywheel 122 through endless belts 124. Flywheel 122 has a crank shaft 125 connected to it and to which the pistons 60 and 61 are connected by means of cranks 66 and 68 of the crank shaft. The end of the crank shaft 125 opposite flywheel 122 has a similar flywheel 126 connected thereto. Connected to the side of flywheel 126 facing pick-up 70 is a sprocket 128. Sprocket 128 is connected to a sprocket 129 through an endless chain 130. The sprocket 129 provides a power input for a gear box 131. The gear box has an output shaft 132 having a sprocket 134 (FIG. 4) connected by an endless chain 135 to a sprocket 136 which drives the feed roller 101 and intermediate conveyor 92 via shaft 138. Shaft 138 has mounted thereon a sprocket 139 connected to the drive sprocket 140 for the infeed roller 95 by an endless chain 141.

The sprocket 129 is also connected to a cross-shaft 142 (FIGS. 2 and 4) which extends to the outboard end of the machine to drive a first chain 144 connected as shown best in FIG. 1 to operate the pick-up and a second chain 145 connected to the outboard end of the auger conveyor 78 to operate it. On shaft 142 adjacent to the sprocket 129 is a drive through chain 146 to a gear box 148. The gear box 148 has an output shaft 150 connected through sprocket 151 and chain 152 to sprocket 154 for driving the high speed saw 84. The star wheels 88 which press the crop material into the saw 84, the presser rollers 90 and 100 are driven by a chain 155 interconnecting sprockets 156 and 158. Sprocket 156 is mounted on and driven by shaft 138. Sprocket 158 is connected to the star wheels and presser rolls by shaft 159.

Thus the single engine M operates all the components of the machine, there being a drive to the crank shaft 125 which reciprocates the pistons 60 and 61. From there the drive is from the flywheel 126 to the gear box 131 which drives the presser and infeed rollers, and through the shaft 142 to drive the pick-up and the auger conveyor. The drive connection through the chain chain 146 off shaft 142 operates the gear box 148 which is connected to the high speed saw.

In opertaion, when the machine is moved across a field of previously cut crop material, the pick-up fingers 72 engage such material and elevate it. The material is conveyed over the stripper members 75 and deposited rearwardly onto the feed platform 76. The auger conveyor 78 conveys the material laterally and toward saw 84. The rapidly rotating saw sweeps up into the material and divides it into a forward and a rear portion, the material being pressed toward the saw by the star wheels 88. The crop material which is forwardly of the saw is conveyed by the infeed mechanism described to the inlet chamber 30. The other portion of material rearwardly of the saw is conveyed to inlet chamber 31. The infeed rollers 95 and 100 operate in timed relation and the fingers thereon sweep the material into the inlet chambers 30 and 31 between compressing strokes of the pistons 60 and 61. While the crop material is being fed into inlet 30, the material in inlet 31 is being operated upon by the piston 61 and forced into compression chamber 28. When the piston 61 retracts, chamber 31 is open to receive a new charge of material. At the same time, piston 60 operates on a working stroke in inlet chamber 30. The successive compressed charges of material are directed into their respective compression chambers and the variable pressure plates 35 in these chambers shift automatically and constantly to regulate the density of the pellets formed by the machine. When the longitudinal force on a plate 35 exceeds a predetermined amount the plate will shift rearwardly and downwardly to thereby relieve the pressure of the material. When the overloaded condition has dissipated, the plate will return toward normal position by the hydraulic means 48. After each pellet is formed it is directed into one of the tubes 51 whereupon it is conveyed and deposited in a trailing wagon W.

It will be noted that the material forwardly of the saw 84 passes over the path of reciprocation of the piston 61 and then drops downwardly into the inlet 30. Such arrangement provides for compression chambers which are disposed in a common horizontal plane, simplifying the drive mechanism for operating the pistons which force and compress the material into the compression chamber.

While this invention has been described in connection with a particular embodiment thereof, it will be understood that it is capable of further modification and this application is intended to cover any variations, uses or adaptations of the invention following, in general, the principles of the invention and including such departures from the present disclosure as come within known or customary practice in the art to which the invention pertains and as fall within the scope of the invention or the limits of the appended claims.

Having thus described our invention, what we claim is:

1. Apparatus for forming hay and other crop material into pellets comprising first and second coextending compression chambers mounted side by side, means operable in a direction transverse to said chambers for conveying material into said first chamber and past the first chamber and into the second chamber, said chambers having inlet sections through which said material is admitted, means severing conveyed material to divide it into first and second portions for said first and second inlet sections, respectively, a first means operable to form material deposited in said first section into pellets, a second means operable to form material deposited in said second section into pellets, and means alternately operating said first and second pellet forming means.

2. Apparatus as recited in claim 1 wherein said inlet sections in said chambers are spaced relative to each other in the direction of extension of the chambers.

3. Apparatus as recited in claim 1 wherein the means severing the conveyed material operates in a vertical plane parallel to said transverse direction.

4. Apparatus as recited in claim 3 wherein said severing means comprises a high speed circular saw.

5. Apparatus as recited in claim 4 wherein conveyed material is passed over said saw, means being provided cooperative with the saw to press the material into the teeth of the saw.

6. Apparatus as recited in claim 5 wherein means is provided for rotating said saw in such direction that its teeth move upwardly into the material conveyed toward and over it.

7. Apparatus as recited in claim 1 wherein means is provided for alternating feeding material into said inlet sections of said compression chambers.

8. Apparatus as recited in claim 1 wherein said first and second pellet forming means comprise a pair of alternately operable pistons, one for said first chamber and one for said second chamber, said pistons reciprocating through said inlet sections, and means movable into each of said inlet sections between strokes of said pistons to feed material into the sections.

9. Apparatus as recited in claim 8 wherein said movable feed means comprises a plurality of feed fingers spaced relative to each other in the direction of reciprocation of said pistons.

10. Apparatus as recited in claim 9 wherein said feed fingers are rotatably mounted and means is provided for supporting the fingers for yieldable movement in a direction opposite to their direction of rotation.

11. Apparatus as recited in claim 8 wherein said movable feed means comprises two sets of rotatable feed fingers, one set for each inlet section, the fingers of each set being relatively spaced in the direction of reciprocation of said pistons and progressively angularly spaced from a first feed finger proximate to its associated piston to a last feed finger more remote therefrom.

12. Apparatus as recited in claim 11 wherein means is provided for rotating each set of fingers in such direction and said angular spacing of each set of fingers being such that the fingers successively enter their associated inlet section first finger first.

13. Apparatus as recited in claim 12 wherein each finger of each set of fingers is spring loaded and yieldable in a direction opposite to its direction of rotation.

14. Apparatus as recited in claim 13 wherein each finger is arcuate and presents a convex face in its direction of rotation.

15. Apparatus as recited in claim 9 wherein means is provided for precompressing the material delivered to said inlet sections.

16. Apparatus for forming crop material and the like into pellets comprising an elongated compression chamber having a lateral feed opening, a piston reciprocable in said chamber, said piston having a retracted position at one side of said opening and moving therefrom on a working stroke to an extended position wherein it projects across the opening, means reciprocating said piston between said retracted and extended positions, and means for feeding hay into said chamber between working strokes of said piston, said feeding means comprising two sets of feed fingers rotatable about an axis parallel to the reciprocation of said piston, power means rotating said sets of fingers whereby one set of fingers moves into and then out of said compression chamber after a given working stroke of said piston and the other set of fingers similarly moves after the next working stroke of the piston, said fingers of each set being successively axially spaced and progressively angularly spaced from a first finger adjacent said piston when retracted to a last finger remote therefrom, said fingers of each set moving into and then out of said compression chamber first finger first, and said means for reciprocating said piston moving the piston part way across said inlet opening on a working stroke before the last finger of the particular set of fingers passing through said chamber has been extracted therefrom.

References Cited in the file of this patent

UNITED STATES PATENTS

| | | |
|---|---|---|
| Re. 23,582 | Baskerville | Nov. 18, 1952 |
| 220,019 | Gehrt | Sept. 30, 1879 |
| 1,053,908 | Goldschmidt | Feb. 18, 1913 |
| 1,075,781 | Goldschmidt | Oct. 14, 1913 |
| 1,260,053 | Reynolds | Mar. 19, 1918 |
| 1,871,833 | Anderson | Aug. 16, 1932 |
| 1,996,395 | Arnold | Apr. 2, 1935 |
| 2,059,229 | Gregg | Nov. 3, 1936 |
| 2,114,218 | Edenfield | Apr. 12, 1938 |
| 2,360,487 | Fullerton | Oct. 17, 1944 |
| 2,716,317 | McClellan | Aug. 30, 1955 |
| 2,966,842 | Roche | Jan. 3, 1961 |

FOREIGN PATENTS

| | | |
|---|---|---|
| 1,223,140 | France | Jan. 25, 1960 |
| 347,769 | Germany | Jan. 26, 1922 |